United States Patent
Gunbatar

(10) Patent No.: US 10,599,151 B1
(45) Date of Patent: Mar. 24, 2020

(54) TRANSFORMER (MODIFIER) DESIGN FOR CONTROLLING ARTICULATED VEHICLES SMOOTHLY

(71) Applicant: AG Leader Technology, Inc., Ames, IA (US)

(72) Inventor: Yakup Gunbatar, Ames, IA (US)

(73) Assignee: AG LEADER TECHNOLOGY, INC., Ames, IA (US)

( * ) Notice: Subject to any disclaimer, the term of this patent is extended or adjusted under 35 U.S.C. 154(b) by 137 days.

(21) Appl. No.: 15/862,390

(22) Filed: Jan. 4, 2018

Related U.S. Application Data

(60) Provisional application No. 62/446,009, filed on Jan. 13, 2017.

(51) Int. Cl.
G05D 1/02 (2020.01)
A01B 69/00 (2006.01)
A01B 79/00 (2006.01)

(52) U.S. Cl.
CPC ......... G05D 1/0212 (2013.01); A01B 69/004 (2013.01); A01B 79/005 (2013.01); G05D 2201/0201 (2013.01)

(58) Field of Classification Search
CPC .......... G05D 1/0212; G05D 2201/0201; A01B 69/004; A01B 79/005
USPC ......................................................... 701/23
See application file for complete search history.

(56) References Cited

U.S. PATENT DOCUMENTS

| | | | |
|---|---|---|---|
| 4,103,561 A | 8/1978 | Baker | |
| 4,756,543 A | 7/1988 | Cromnow et al. | |
| 7,124,579 B1 | 10/2006 | Gehlhoff | |
| 7,142,956 B2 | 11/2006 | Heiniger et al. | |
| 9,454,153 B2 * | 9/2016 | Sights | G05D 1/0088 |
| 2003/0229430 A1 * | 12/2003 | Beek | B62D 5/046 701/41 |
| 2009/0204281 A1 * | 8/2009 | McClure | G05D 1/0246 701/25 |
| 2011/0231061 A1 * | 9/2011 | Reeve | A01B 79/005 701/41 |
| 2014/0025260 A1 * | 1/2014 | McClure | B62D 5/046 701/41 |

OTHER PUBLICATIONS

Bevly, David M., "Gnss for Vehicle Control (GNSS Technology and Applications)", https://www.amazon.com/Gnss-Vehicle-Control-Technology-Applications/dp/1596933011[Jan. 2, 2018 2:41:19 PM], 4 pages, accessed by Applicant Jan. 2, 2018.

* cited by examiner

*Primary Examiner* — Muhammad Shafi
(74) *Attorney, Agent, or Firm* — Goodhue, Coleman & Owens, P.C.

(57) ABSTRACT

The present invention relates to a practical approach to alleviate or remove the jerky heading change in ArVs. The rate of change of articulation angle in heading kinematics is effectively canceled. This modification (also called as transformer) can be done such that articulated vehicles can change their heading similar to front wheel-steered vehicles.

14 Claims, 15 Drawing Sheets

(BASIC COMPONENTS OF HYDRAULIC STEERING)

(BASIC ELEMENTS OF AGRICULTURAL VEHICLE AUTOMATION SYSTEM)

(EXAMPLES OF TYPICAL AUTOSTEERING WITH PID COMPENSATION)

(SIMPLIFIED SCHEMATIC OF PID CONTROLLER)

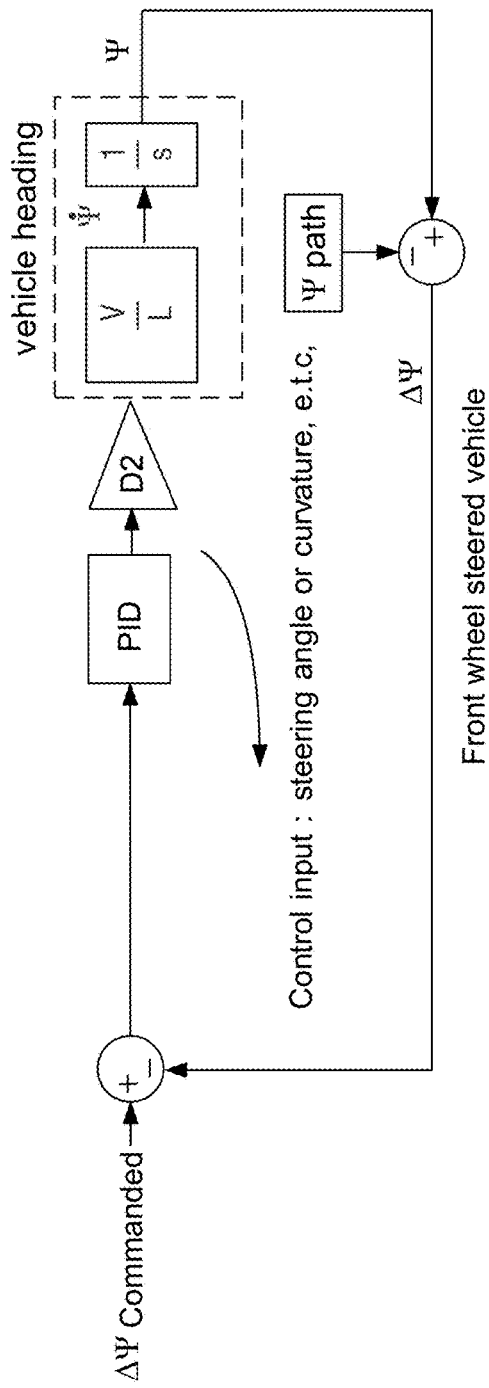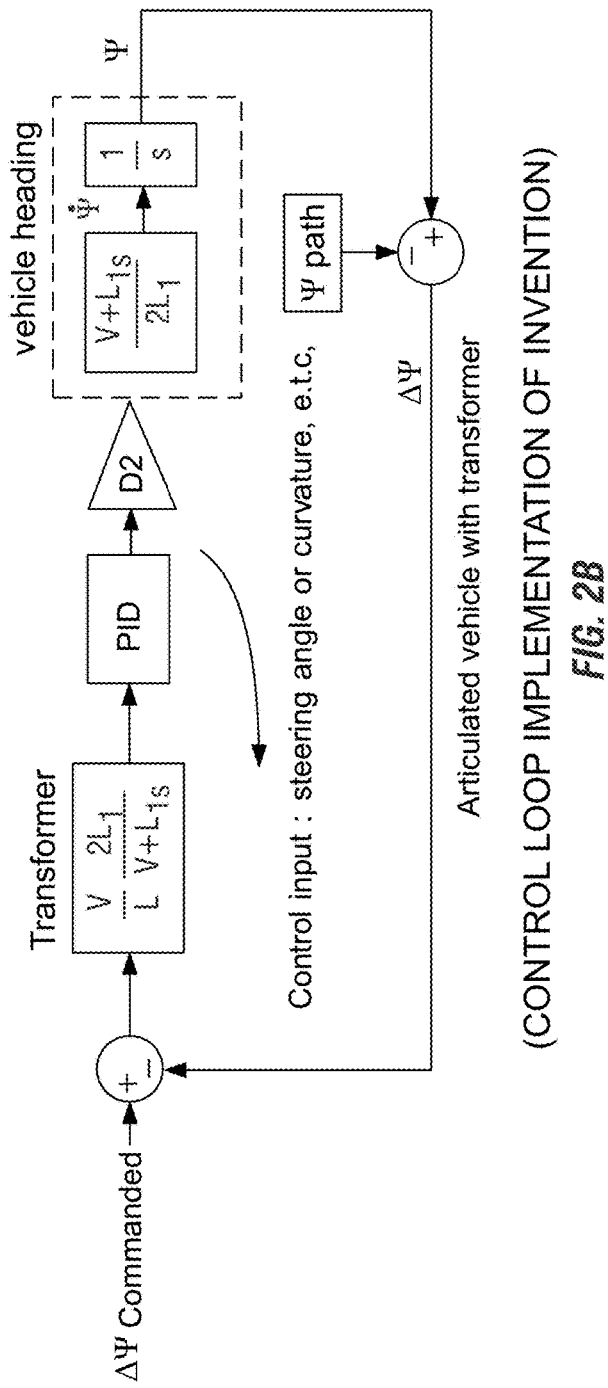

TRANSFORMER (MODIFIER) DESIGN FOR CONTROLLING ARTICULATED VEHICLES SMOOTHLY

CROSS-REFERENCE TO RELATED APPLICATIONS

This application claims the benefit of Provisional application U.S. Ser. No. 62/446,009 filed on Jan. 13, 2017, all of which is herein incorporated by reference in its entirety.

I. BACKGROUND OF THE INVENTION

A. Field of the Invention

The present invention relates to automated steering of vehicles and, in particular, to the automatic steering of articulated vehicles.

B. Problems in the State of the Art

Differently from front wheel-steered vehicles, articulated vehicles can change their heading rapidly via articulation angle, pivoting (steering) mechanism placed almost in the middle of the vehicle (see FIG. 1G-I). At low speed and even at standing still they can change vehicle heading by pivoting. However, this is not desired due to jerky rotation (jerky lateral motion). Besides, instant quick responses to heading changes can result in cross track error, lateral movement of the control point from the desired path depending on the selection of control point on the vehicle. And more importantly, these quick heading changes can easily lead to bouncing and eventually to oscillatory response in steering system and in path following. It is known that main advantages of articulated vehicles are traction and power superiority. Therefore, a practical approach to alleviate or remove the jerky heading change is to cancel the rate of change of articulation angle in heading kinematics. Besides, this modification (also called a transformer) can be done such that articulated vehicles can change their heading similar to front wheel-steered vehicles. Here, we picked the parameters in design such that articulated vehicles with respect to heading kinematics will behave like a commercially-available front-wheel steered vehicle (i.e. Case 210) as a nominal vehicle. This approach also allows the use of the gains, tuned for a Case 210, for articulated vehicles. This eliminates an important amount of time of tuning. As will be appreciated by those skilled in this technical area, the designer according to the invention can select parameters or other nominal vehicles.

Automatic steering communicates a programmed path for the vehicle to travel to an actuator that changes the wheel angle of the vehicle at one or more axles. In many agricultural vehicles, a hydraulic system translates steering instructions from a steering wheel or other manual control to steerable wheels. See FIG. 1A for one basic example. Autosteering uses programmable devices to directly control such actuators.

In agriculture, path instructions are typically relative to a desired wheel track or path through a field. One example is a continuous path through an entire field for effective and efficient spacing of row crops. This can involve multiple turns, such as row ends, and non-linear rows, which also requires steering. Another example is following planted row crops when applying chemicals such as fertilizer in a non-overlapping manner.

Autosteering systems cooperate with navigation systems which use sensors to estimate such things as speed and position in the field versus intended path. A variety of commercially available autosteering/navigation systems for agricultural vehicles exist. One example is SteerCommand™ from Ag Leader Technology, Inc. of Ames, Iowa USA.

Generally, autosteering relies on steering angle instructions from a navigation planner. See FIG. 1B for a high-level schematic of the type of automated steering system to which the invention can be applied.

The navigation planner relies on sensor measurements from which such things as vehicle position/speed, heading, yaw, etc. can be estimated. See. FIG. 1B and FIG. 1C, which are block diagrams of examples (Parts 1 and 2) of an automated steering system to which the invention can be applied.

Many of these autosteering systems use what is called a PID type controller. See PID element in context of autosteer system in FIG. 1C and simplified diagram of PID operation at FIG. 1D for illustration of this well-known technique. In FIG. 1C (part 1), the outer loop is for the cross track error, XTE and the inner loop is for the heading error, $\Delta\Psi$. They are shown on a farming operation in FIG. 1F. In FIG. 1C (part 1), blocks D1 and D2 stand for any unit conversion or constants, etc., used in the loops. In FIG. 1C (part 2), the vehicle block is explored, where steering system and estimation system, Kalman Filter, are seen. IMU stands for inertial measurements unit, accelerometers, gyros, and possibly magnetometer.

PID control can help produce inputs that reduce offset between commanded and measured actual signals. This signal can be steering angle, heading angle, lateral displacement in the field. More details on PID control relative to autosteering can be found at U.S. Pat. No. 7,142,956, incorporated by reference herein.

A block diagram of a PID controller in a feedback loop is set forth below at FIG. 1D, where r(t) is the desired process value or "set point", and y(t) is the measured process value (here, steering instructions):

a. P accounts for present values of the error. For example, if the error is large and positive, the control output will also be large and positive.
b. I accounts for past values of the error. For example, if the current output is not sufficiently strong, the integral of the error will accumulate over time, and the controller will respond by applying a stronger action.
c. D accounts for possible future trends of the error, based on its current rate of change.

This PID control is a fairly mature technique in the industry and widely used. It is based on well-known equations and inputs. While it works fairly well for its intended purpose, several competing factors make room for improvement in this area.

For example, sometimes a vehicle does not move in a precise intended path in the field. Field conditions (e.g. dry or wet, uneven ground, debris, and other things) can cause deviations. Additionally, the type of vehicle, how is driven, and its traction can cause deviations including such well-known issues as cross track error (XTE). A rear wheel drive, front wheel steered vehicle (FrV) will tend to understeer or slide relative a programmed path. This could require quite substantial and severe steering correction.

On the other hand, even quick and aggressive steering corrections to try to correct error between the actual heading and the programmed heading may not produce the intended result. Such things as sliding of the front of the tractor, cross track error, or the like, require the PID controller to adjust steering control to compensate for these types of complexities.

PID based steering controllers try to balance these sometimes competing factors by using one, two, or more PID compensators to minimize offset between the programmed path and measured path. Each of them can be tuned for even more control, such as is well-known in this technical area. Front wheel steered vehicles (FrV) such as the Case Model 210 (see FIG. 1E) utilize a navigation nomenclature such as set forth in FIG. 1F.

But increasing popularity of articulated tractors (ArV's) (see, e.g., both wheeled and tracked ArV's at FIG. 1G and FIG. 1H) has complicated the situation. As mentioned above, superior traction and power enable larger payloads and wider implements with ArV's. However, the articulated vehicles, by nature, tend have more responsive steering control than front steer vehicles. The increased traction produces quicker and more faithful response to a steering adjustment. But this can lead to jerking or other disruptive motions.

A basic simplified plan view of such a vehicle and its navigation coordinates is shown at FIG. 1I. This shows some of the complexities articulated vehicles present relative to autosteering.

Another schematic of those navigation coordinates is shown below at FIG. 1J, and will be used in later descriptions of how to implement the invention.

With increased responsiveness an ArV has to steering instructions comes a problem. Consider, first, a FrV. Turning the front wheels while the rear driven wheels operate, attempts to push the front of the vehicle in a straight line. Some lag, cross track error, and other complications are created. However, these can be compensated by the navigation system and the PID compensation.

Compare an ArV. Because it at least pivots along this frame, and typically has front and rear driven wheels, the understeer or rear driven wheels problem is lessened. But the improved traction and power tend to produce quicker steering response, including for substantial steering changes.

One problem becomes a jerky, jostling action by an articulated vehicle in response to autosteering. Because autosteering attempts to follow as precisely as possible the programmed path, this can range from being merely unsettling to the operator to being quite disruptive to the operator. It also may actually increase wheel deviation from the programmed path with such things as cross track error. These types of problems are explained in U.S. Pat. Nos. 4,756,543; 4,103,561; and 7,124,579, each of which is incorporated by reference herein in its entirety respectively.

A subtle complexity is that if the autosteering system is set up for front steer vehicles, tuning the PID controller to compensate for an articulated vehicle may not be sufficient to eliminate disruptive autosteering. Furthermore, it can be desirable to use the same steering system for a variety of vehicles, both front steer and articulated, as well as get the same operator "feel" of FrV response with ArV's.

Thus, there is room for improvement in this technical field. The subtlety is how to compensate for disruptive motion of autosteering with an articulated vehicle.

II. SUMMARY OF THE INVENTION

A. Objects, Features, and Advantages

Via this method, smooth steering and heading control are attained for articulated vehicles. In addition, it helps getting better XTE in general, particularly in presence of noise and disturbances.

It is therefore principal object, feature, and advantage of the present invention to provide an improvement over or solve problems and deficiencies in the state-of-the-art.

Other objects, features, and advantages of the invention include one or more of:

a. Modification of autosteering to smooth out or at least reduce disruptive steering changes for articulated vehicles.

b. Provide for better compensation for cross track error, especially in the presence of noise and disturbances.

c. Provide for more accurate line or path following.

d. Make an articulated vehicle autosteering feel more like front steered vehicles.

e. Does not change the heading without moving.

f. Does not require any additional tuning, so can use existing front wheel steer or universal autosteer systems.

g. Can also produce more accurate path following to avoid unnecessary steering changes.

h. By reducing quick, aggressive turning changes, particularly at the articulation point of an ArV, reduces wear and tear on articulation and steering components.

i. This invention/feature can be disabled anytime, in case of need.

j. It does not involve/require any mechanical or physical change to the vehicle and vehicle steering mechanism.

These and other objects, features, aspects and advantages of the invention will become more apparent with reference to the accompanying specification.

B. Aspects of the Invention

A first aspect of the invention is a methodology of autosteering for articulated vehicles. A PID control is modified to cancel the rate of change of articulating angle in the heading kinematics of the autosteering system. It was discovered that rate of change of articulation angle of an ArV plays a major role in heading angle rate of change. By modifying this parameter, ArV autosteering is smoothed out what otherwise would be more rapid, abrupt, and frequent steering changes, and thus reduces disruption of operation and cross track error. In one embodiment, the autosteering PID programming in the PID controller is modified by:

$$M(s) = \frac{2V}{L} \frac{1}{s + \frac{V}{L_1}} \tag{1}$$

In other words, PID controller in heading loop of the controller system for ArV is serially connected with this function, see FIG. 2B, to get the response of an FrV, see FIG. 2A.

Using an FrV, heading rate equation $$\dot{\psi} = \frac{V}{L} \tan\delta \tag{2}$$

where
V=velocity
L=FrV wheel base
δ=steering angle (front wheels)
ψ̇=rate of change of heading angle Creating a transfer function (e.g. Laplace transform) based on the FrV heading rate equation:

$$\frac{\psi}{\delta}(s) = \frac{V}{L}\frac{1}{s} \qquad (3)$$

where
V=velocity
L=FrV wheel base
δ=steering angle
s=complex variable

To produce a modification to the PID controller for ArV to get the same heading response of a FrV, defined by the function above, is as follows:

$$M(s) = \frac{2V}{L}\frac{1}{s + \frac{V}{L_1}} \qquad (4)$$

where
V=velocity
$L_1$=front wheel base for the ArV
$L_2$=rear wheel base for the ArV
s=complex variable It is assumed $L_1=L_2$ and articulation angle is relatively small (e.g. <15°).

To produce a heading rate for the ArV, which is similar to an FrV, specifically is $$\frac{\psi}{\theta}(s) = \frac{V+L_1 s}{2L_1}\frac{1}{s}\frac{2L_1}{V+L_1 s}\frac{V}{L} = \frac{V}{L}\frac{1}{s} \qquad (5)$$

where
θ=articulation angle of the ArV
V=velocity
$L_1$=front wheel base for the ArV
$L_2$=rear wheel base for the ArV
s=complex variable
ψ=vehicle heading angle It is assumed $L_1=L_2$ and articulation angle is relatively small (e.g. <15°).

As can be seen, this modification results in substantial similarity between transfer functions relative to FrV and ArV. FIGS. 2A and 2B show the control feedback loops for FrV and then ArV with the invented transformer.

In another aspect of the invention, the proportional, integral, and/or derivative estimates of the PID controller to estimate error between desired path as a measured process variable are altered to applying corrections based on PID terms. The P, I, and/or D inputs and PID gains are reduced to deter overshoot and noise. Furthermore, the following limitations are followed. First, it does not change the heading without the vehicle moving. Secondly, it is a function of vehicle speed and vehicle wheelbase. Third, at low-speed it may make the vehicle turn more slowly but is overall less aggressive in the turning. Fourth, it does not require secondary tuning, such that tuning from FrV steering control can be utilized.

Another aspect of the invention comprises a system which includes an articulated vehicle (ArV) with autosteering. The autosteering includes a PID controller. The PID controller is altered and modified in a manner described in the methodology above.

In another aspect of the invention, modified autosteering system comprises a PID controller modified as described above.

In another aspect of the invention, an autosteering system modified as above described is operatively installed in an articulated vehicle (ArV). The articulated vehicle carries onboard navigation sensors, a navigation planner, and a steering controller. The steering controller is modified as described above. The modified autosteer makes the autosteering operate and feel like front steer, particularly related to smoothness of turning, especially at slow speeds. In one embodiment, the modified autosteer also does not allow articulation of the ArV when not moving.

III. BRIEF DESCRIPTION OF THE DRAWINGS

FIG. 2A is an illustration of control loop implementation for an FrV vehicle.

FIG. 2B is an illustration of control loop implementation for an ArV vehicle according to one embodiment of the invention.

FIGS. 3A-D are graphs comparing ArV autosteering with the modification of the invention versus without modification.

Figure 1A:
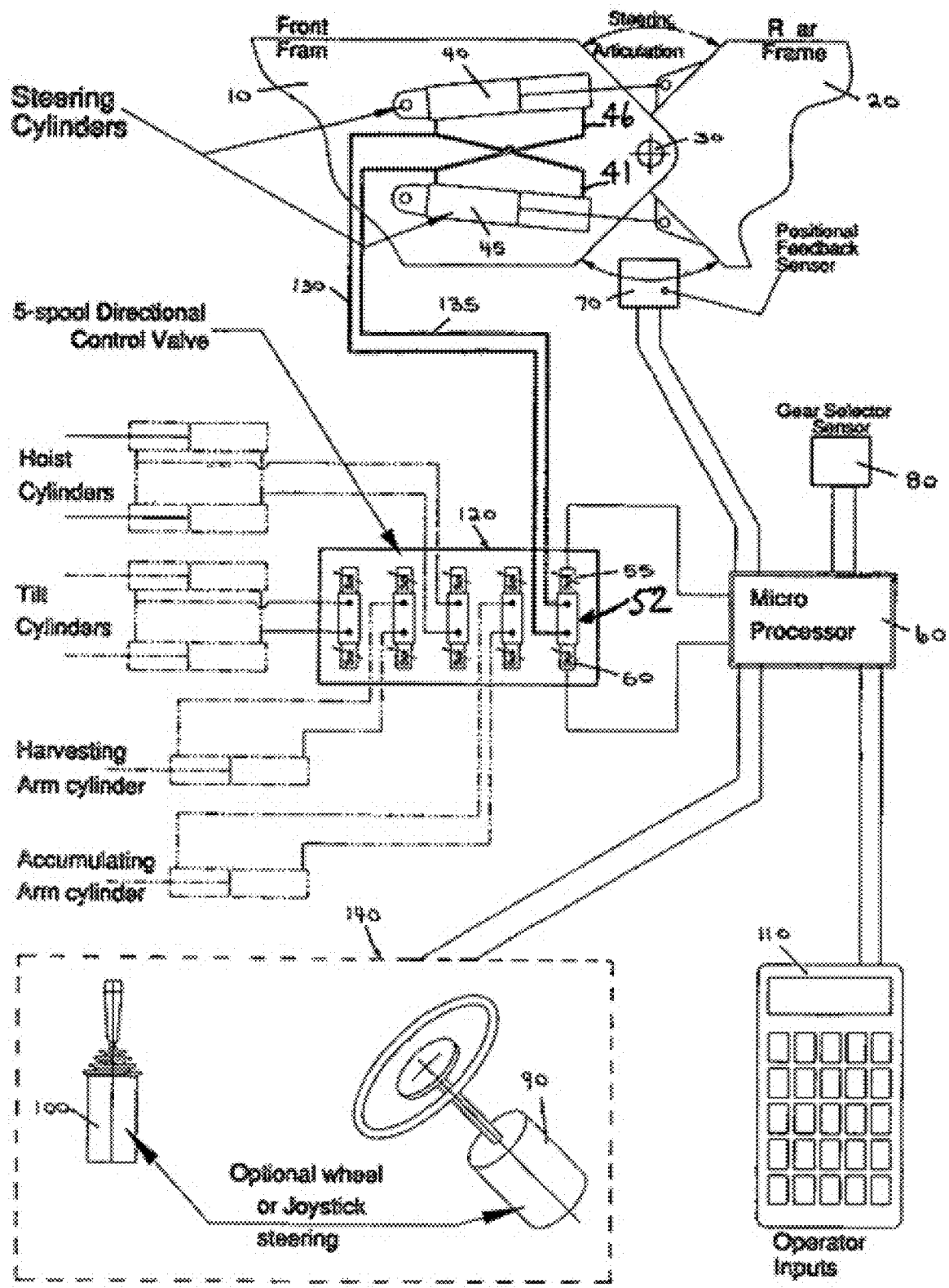
FIG. 1A is a diagrammatic view of a hydraulic-assisted autosteer system.
Figure 1B:
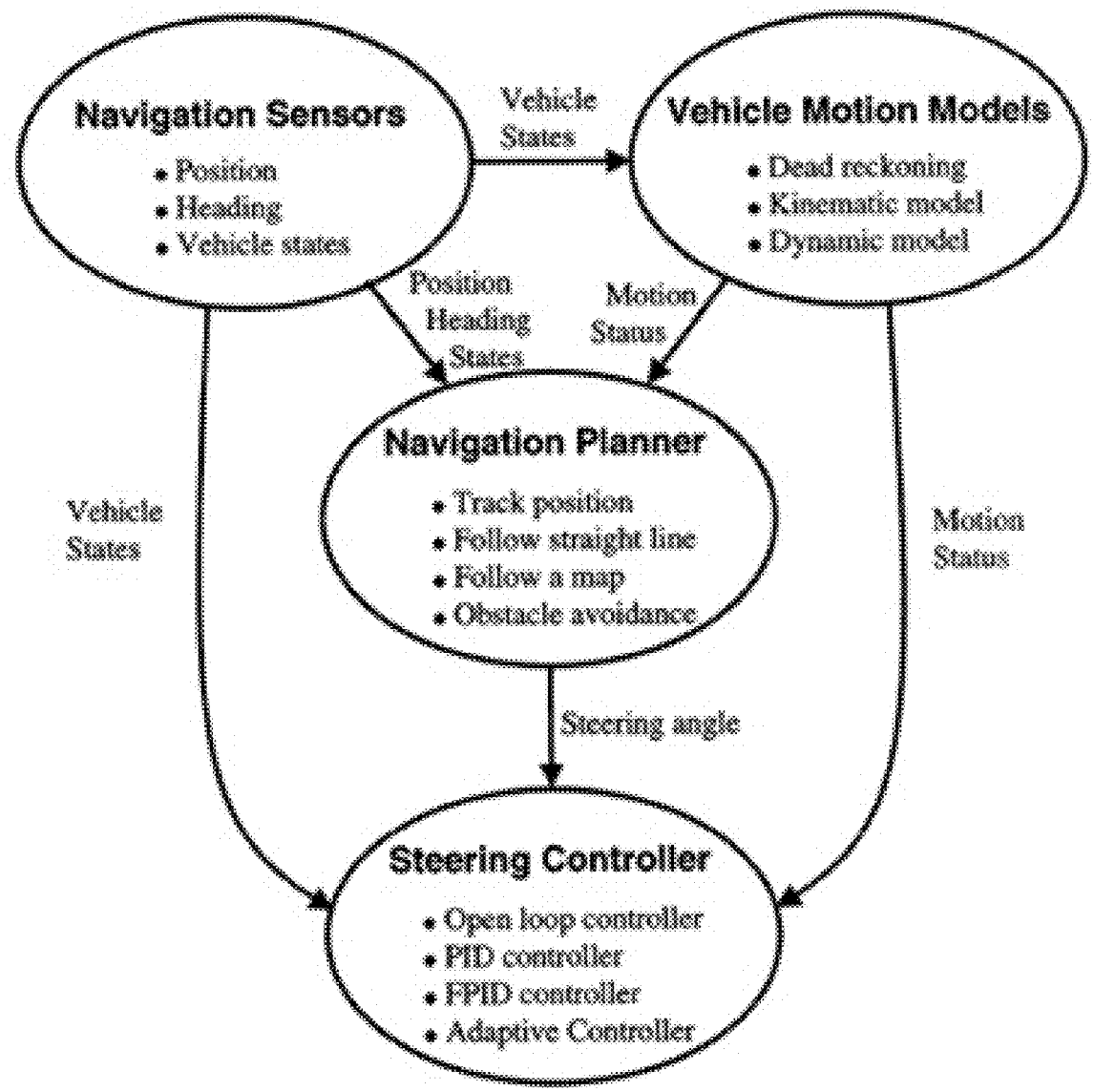
FIG. 1B is a simplified functional diagram of a navigation/autosteer system for a vehicle
Figure 1C:
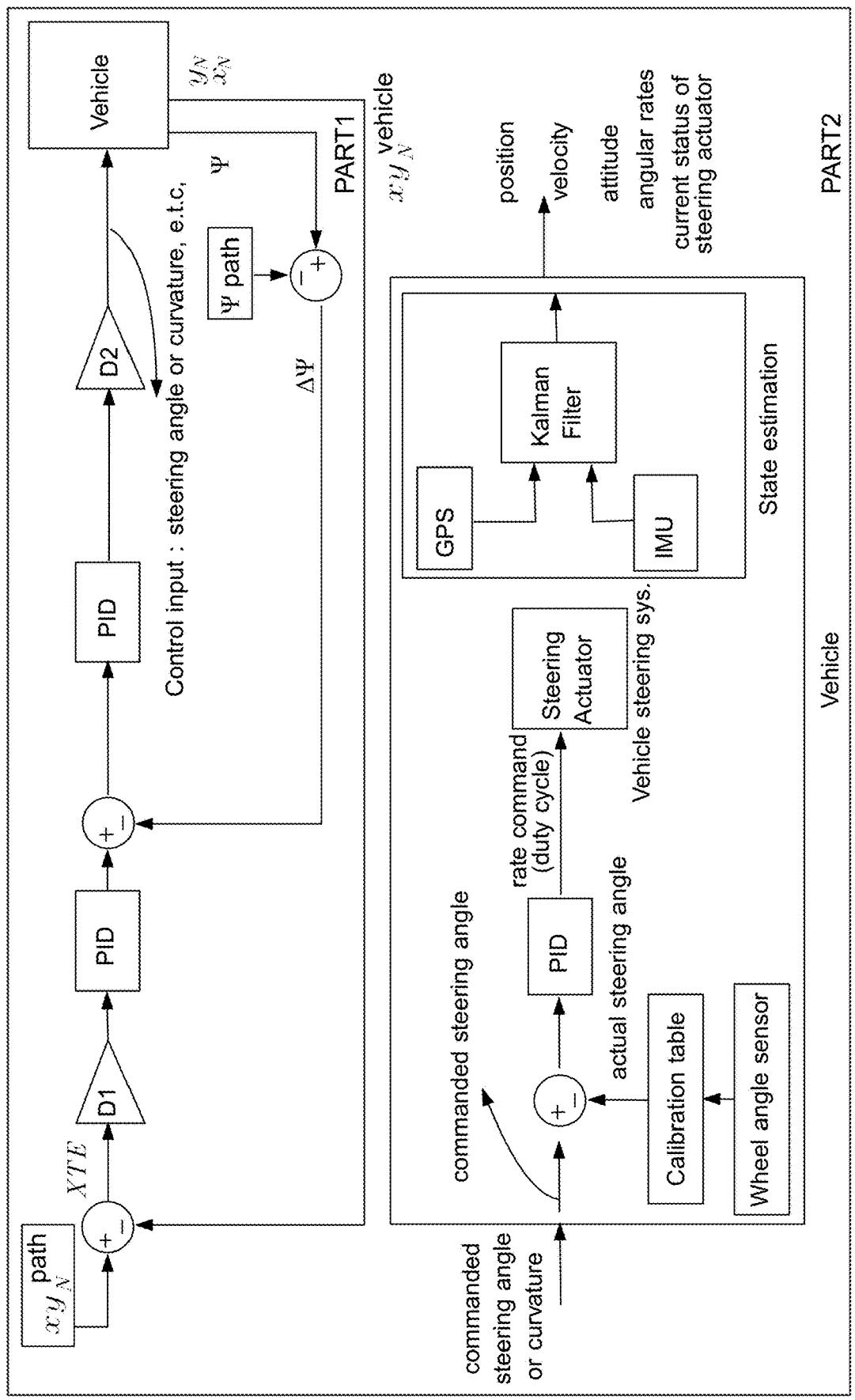
FIG. 1C is block diagrams (parts 1 and 2) of a PID controller based autosteer system for a vehicle.
Figure 1D:
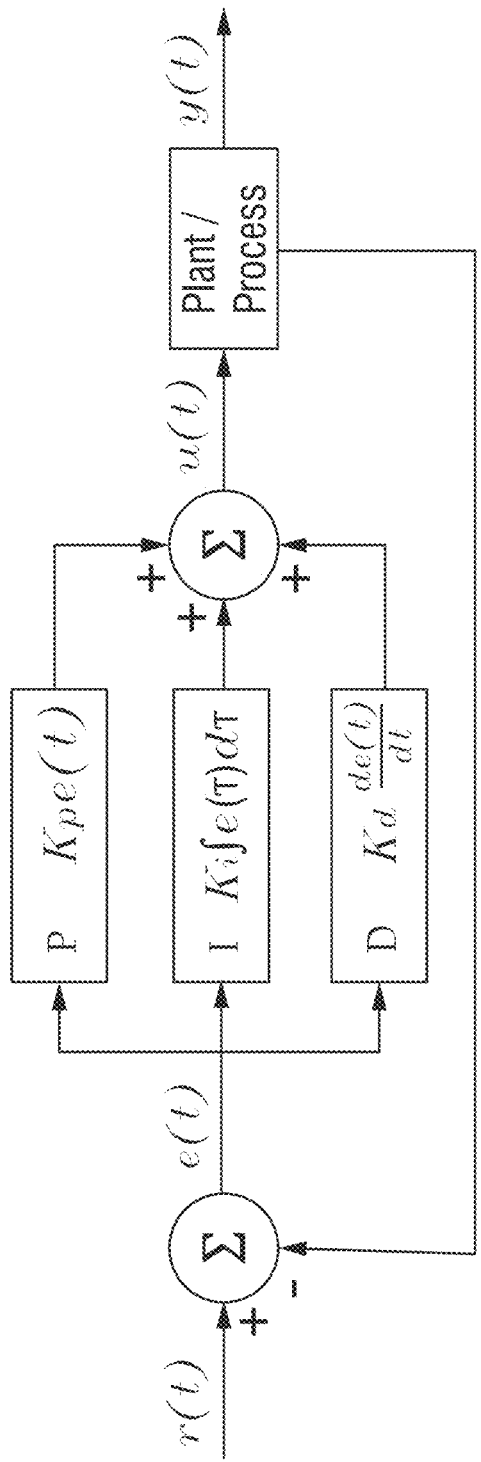
FIG. 1D is a simplified schematic of PID operation.
Figure 4:
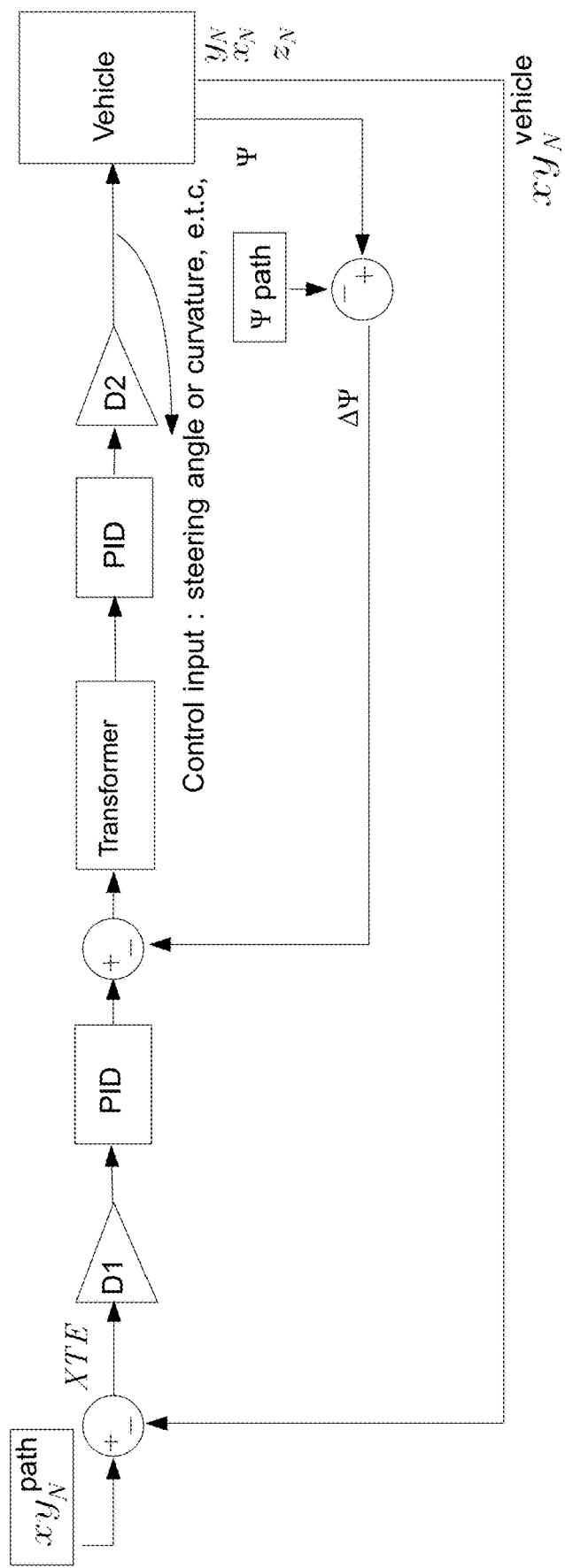

FIG. 4 is a schematic similar to FIG. 1C but showing where the modification of the invention would reside.

IV. DETAILED DESCRIPTION OF EXEMPLARY EMBODIMENTS OF THE INVENTION

A. Overview

For a better understanding of the invention, specific implementations will now be described in detail. It is to be understood that the invention can take many forms and embodiments. The specific examples below are neither inclusive nor exclusive of all forms and embodiment it can take. Variations obvious to those skilled in the art will be included within the invention.

For example, in generalized form, the invention relates to a modified automated steering ("autosteer") system for articulated vehicles. The modified automated steering system includes software which utilizes a feedback loop to compensation for error or offset between a planned navigation path and an actual path. The modification causes the heading rate instructions for articulated vehicles (ArV's) to be similar to front steer (FrV's).

As will be appreciated by those skilled in the art, while applicable to agricultural vehicles (e.g. wheeled or tracked ArV's), it is not limited to them. For example, other ArV's are relevant. A few non-limiting examples are in the construction, and transportation areas.

Figure 1E:
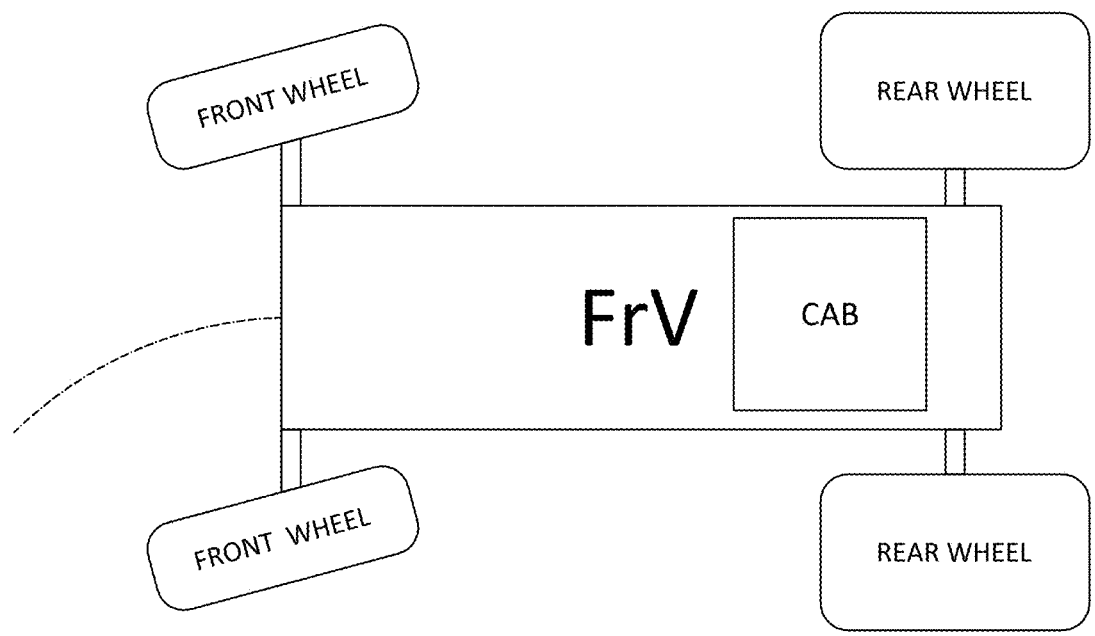
FIG. 1E is an illustration of one example of an FrV vehicle.
Figure 1F:
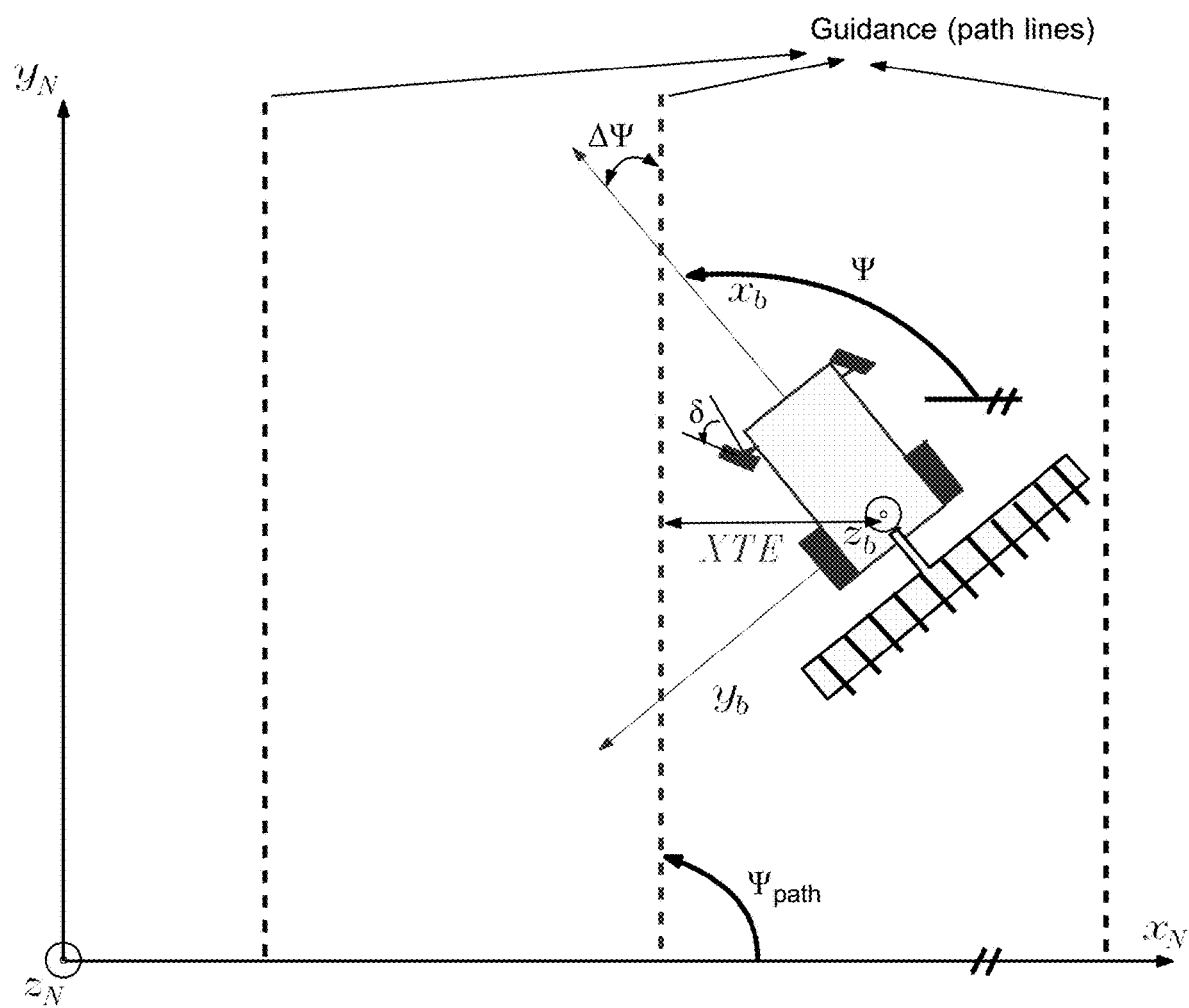
FIG. 1F is an illustration of coordinates of a navigation system for a FrV body fixed frame system on a vehicle in addition to error signals (cross track and heading errors) used in control loops.
Figure 1G:
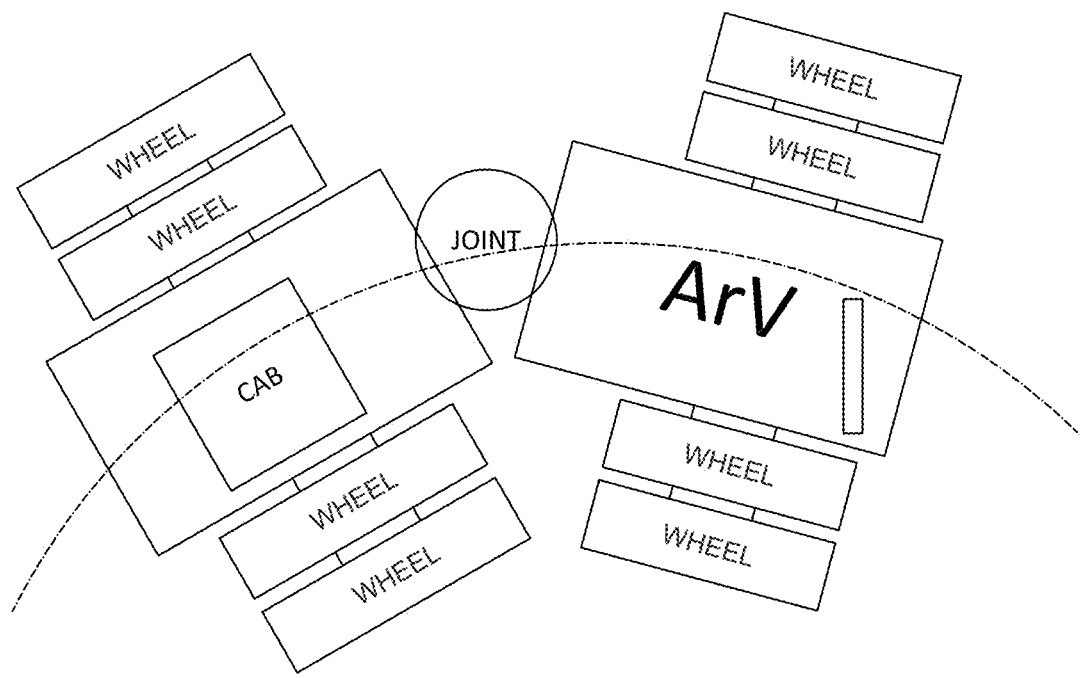
FIG. 1G is an illustration of one example of an ArV vehicle (wheeled).
Figure 1H:
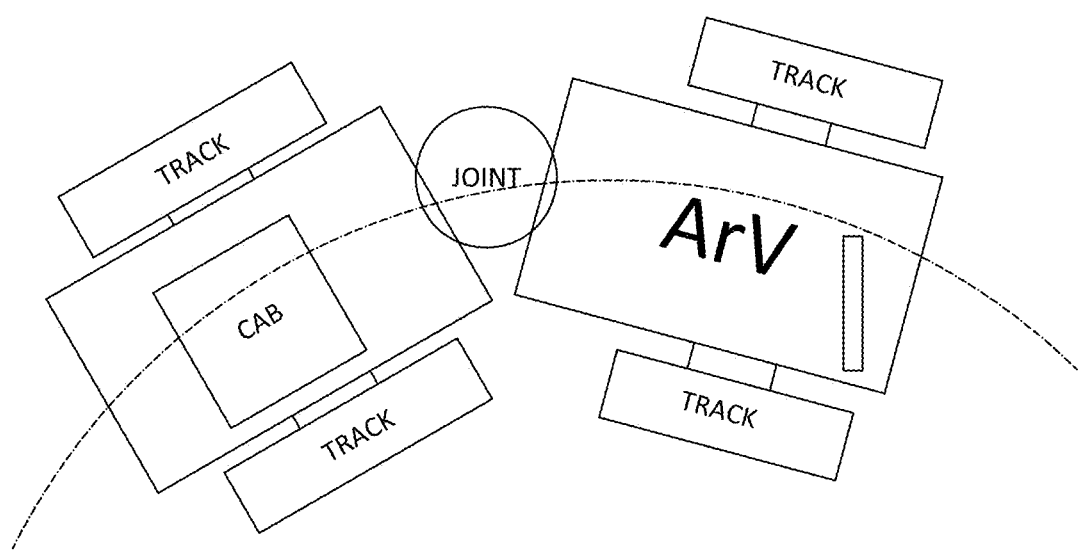
FIG. 1H is an illustration of one example of an ArV vehicle (tracked).

As will be appreciated by those skilled in the art, the specific examples discussed below include some design choices. Those design choices can vary and be applied in analogous ways to other implementations of the invention. For example, in at least some of the specific examples below, comparison of the performance of the new steering control is between the invention applied to a specific ArV (namely, Steiger 400 see FIG. 1G) and a specific FrV (namely, Case 210 see FIG. 1E). The invention can be applied to, compared to, or tested relative other FrV's or ArV's. Additionally, the designer can adjust the performance according to need or desire.

As will also be appreciated by those skilled in the art, the invention can be applied to a variety of different automated steering systems and vehicles, as well as to ancillary functions of the vehicle. A few non-limiting examples for agricultural vehicles include steering an ArV alone, steering an ArV while concurrently performing some agriculture function (e.g. plowing, planting, cultivating, applying chemicals, harvesting), or steering an ArV while it pulls or pushes an implement or trailer.

B. Generalized Example of Methodology

At a generalized level, the invention can be implemented by a transfer function which is discretely implemented in the code. The coding can be relative to the feedback loop for automated steering control. An example of such automated steering control feedback designs before modification can be at Gnss for Vehicle Control (GNSS Technology and Applications which is incorporated by reference herein (https://www.amazon.com/Gnss-Vehicle-Control-Technology-Applications/dp/1596933011).

The transfer function basically modifies the heading rate equation for a ArV. Certain assumptions are made in creating the transfer function. Ultimately, it causes the heading rate of the ArV steering control to be similar to that of an FrV.

This modification basically smoothes out response to steering changes that otherwise would be generated by the PID controller. This reduces the jerkiness of the articulated vehicle, especially at other than low levels beats. It makes the autosteering feel like a front steer. It does not require radical tuning up the gain of the PID controller for the front steer.

Ways in which the transfer function is designed and implemented into an ArV can be shown by specific examples, as will be set forth below.

C. Specific Example of Methodology

1. General Method Applied Specifically (Case 210 FrV Vs. Steiger 400 ArV)

Figure 1I:
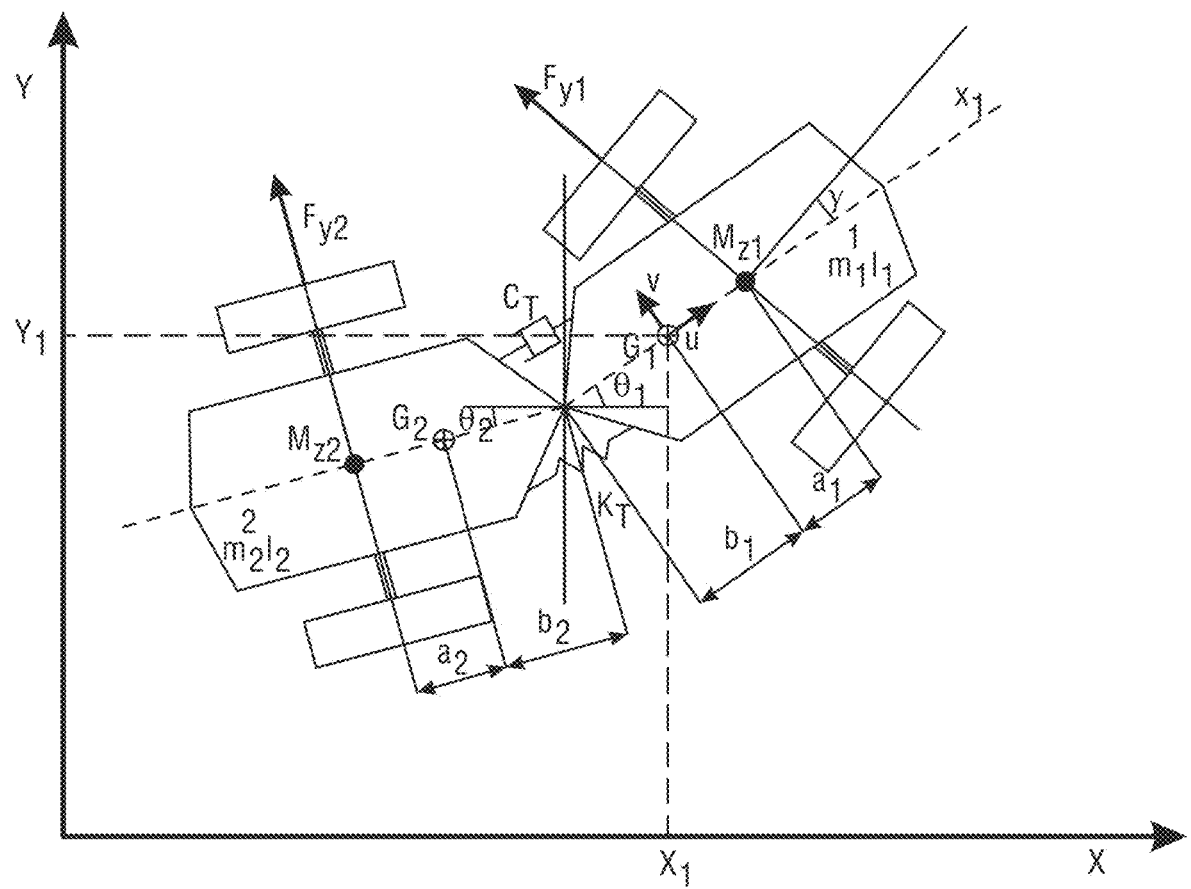
FIG. 1I is an illustration of a top view of an ArV vehicle (tracked), where the vehicle components were illustrated.
Figure 1J:
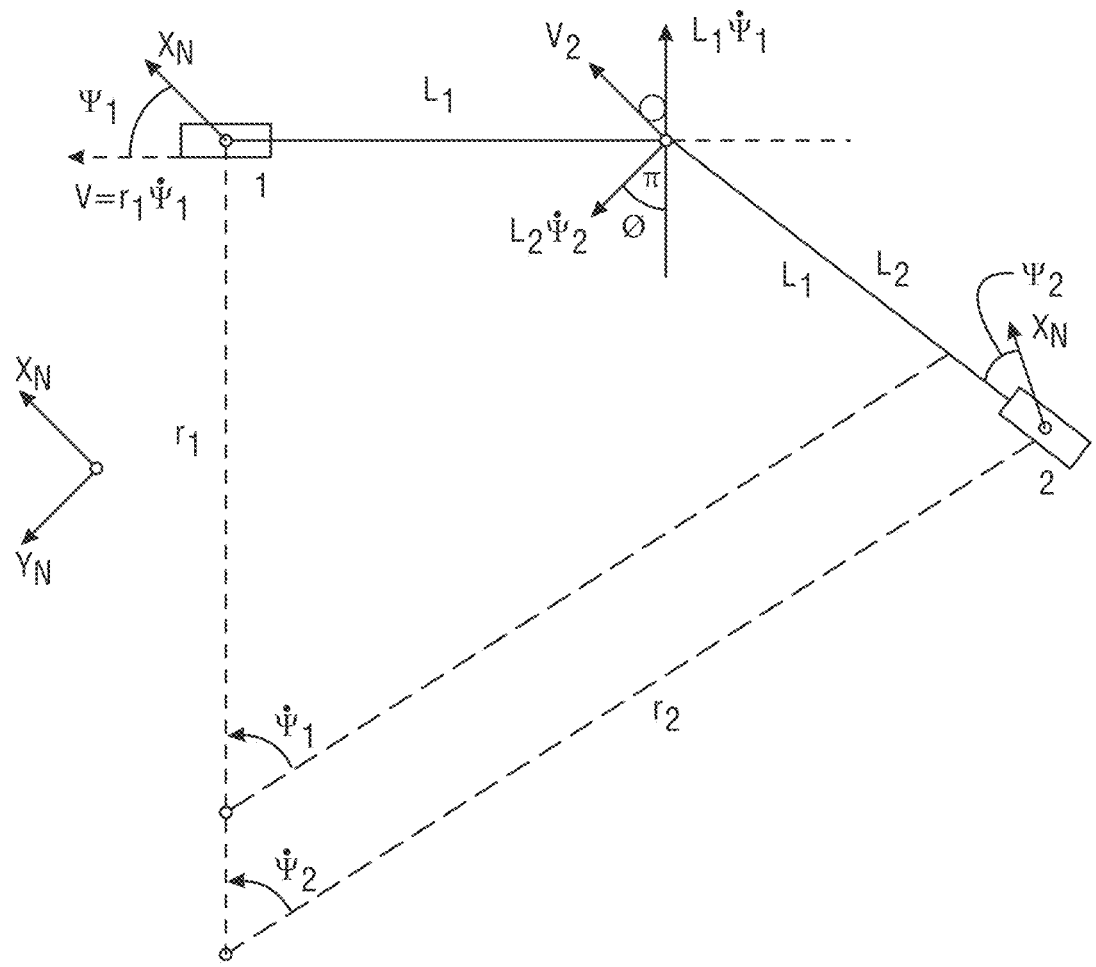
FIG. 1J is a schematic of ArV navigation coordinates.

In an agricultural automated steering system (e.g. like FIGS. 1A-B), which utilizes one or more PID controllers in a feedback loop (e.g. like FIG. 1C), this embodiment of the invention can be applied to modify the PID programming for an ArV as follows:

a. Base the modification on a known FrV. In this example it is a Case 210 (FIG. 1E), where its wheel base between front steer axle and rear axle is indicated by L.
b. Base the modification on a known ArV. In this example it is a Steiger 400 (FIG. 1G), where its wheelbase between its center articulation point and the front axle is indicated by $L_1$, its wheelbase between the center articulation point and the rear axle is indicated by $L_2$. See FIG. 1J.
c. Make the assumption that $L_1=L_2$ (the front and rear wheelbase have the same length).
d. Make the assumption that the maximum range of articulation of the ArV is on the order of <15 degrees.
e. Derive a modification function M(s) for the controller to be used when an ArV is selected for steering control according to the following steps:
  1. Heading rate equation and the corresponding transfer function for FrV, where L is the wheel base for the Case 210, are:

$$\dot{\psi} = \frac{V}{L}\tan\delta \quad (6)$$

$$\frac{\psi}{\delta}(s) = \frac{V}{L}\frac{1}{s}$$

2. Heading rate equation and the corresponding transfer function (using assumptions $L_1=L_2$, front and rear wheel base have the same length and small articulation angle: <15 deg) for ArV are:

$$\dot{\psi} = \frac{V\sin\theta + L_1\dot{\theta}}{L_1 + L_1\cos\theta} \quad (7)$$

$$\frac{\psi}{\theta}(s) = \frac{V + L_1 s}{2L_1}\frac{1}{s}$$

3. Modification to the controller for ArV's is as follows:

$$M(s) = \frac{2V}{L}\frac{1}{s + \frac{V}{L_1}} \quad (8)$$

4. This modification simply causes the heading rate of ArV to be similar to a FrV as can be seen below:

$$\frac{\psi}{\theta}(s) = \frac{V + L_1 s}{2L_1}\frac{1}{s}\frac{2L_1}{V + L_1 s}\frac{V}{L} = \frac{V}{L}\frac{1}{s} \quad (9)$$

f. To produce the following difference equation from M(s):

$$\frac{O}{I}(s) = M(s) = \frac{2V}{L}\frac{1}{s + \frac{V}{L_1}} \quad (10)$$

as follows $$O(k+1) = e^{\left(-\frac{V}{L_1}T\right)}O(k) + \frac{2L_1}{L}\left(1 - e^{\left(-\frac{V}{L_1}T\right)}\right)I(k) \quad (11)$$

where,
  O stands for the output.
  I stands for the input.
  T stands for the sampling time, here 0.1 s.
  V stands for the velocity.
  L stands for wheel-base for a Case 210.
  L1 stands for half wheel base for the articulated vehicle.
  ψ is the vehicle heading angle.

θ is the articulation angle.

$\dot{\theta}$ is rate of change of the articulation angle.

δ is steering angle for front wheel steered vehicles.

S is a complex variable.

k is discrete time step

Figure 3A:
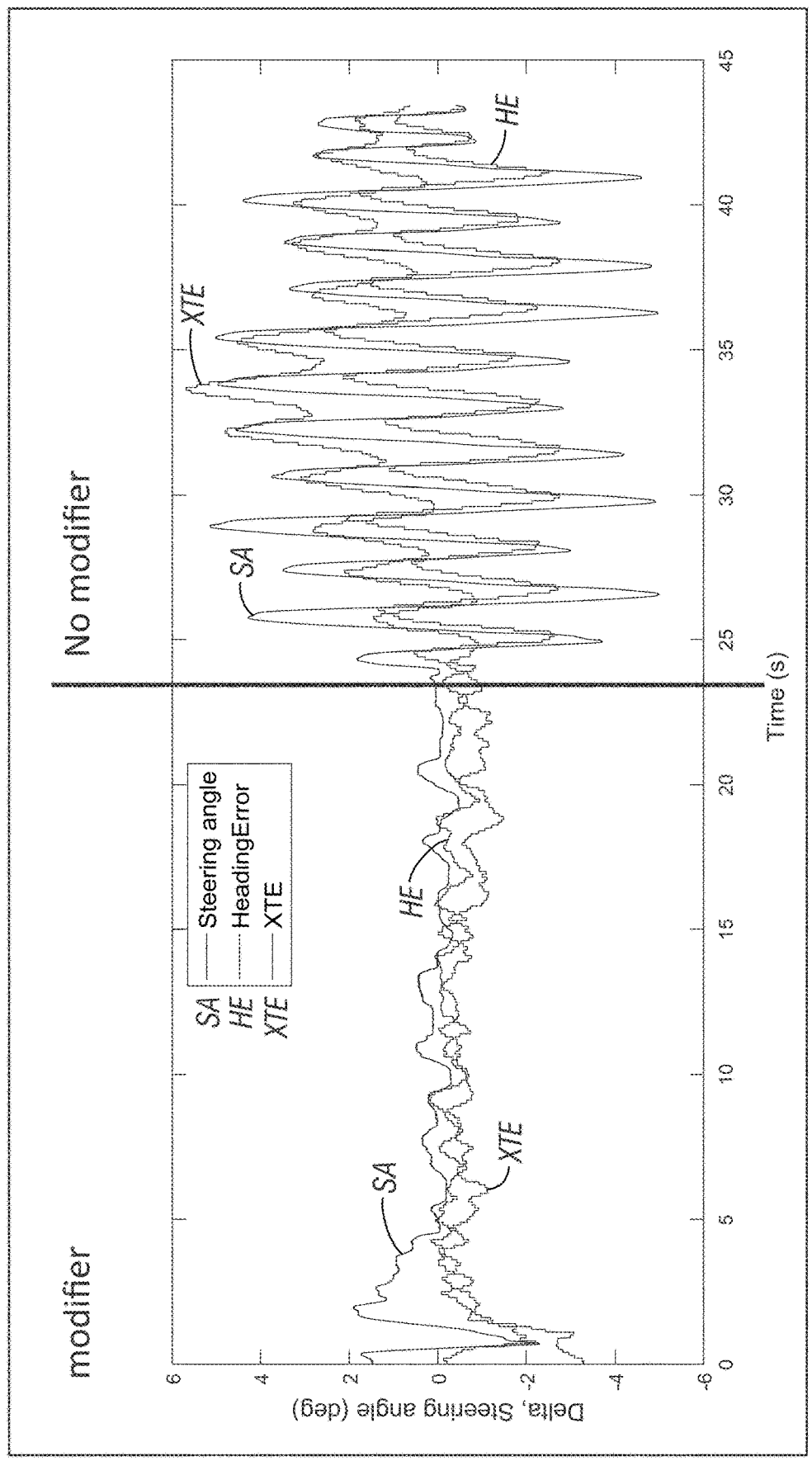
Figure 3B:
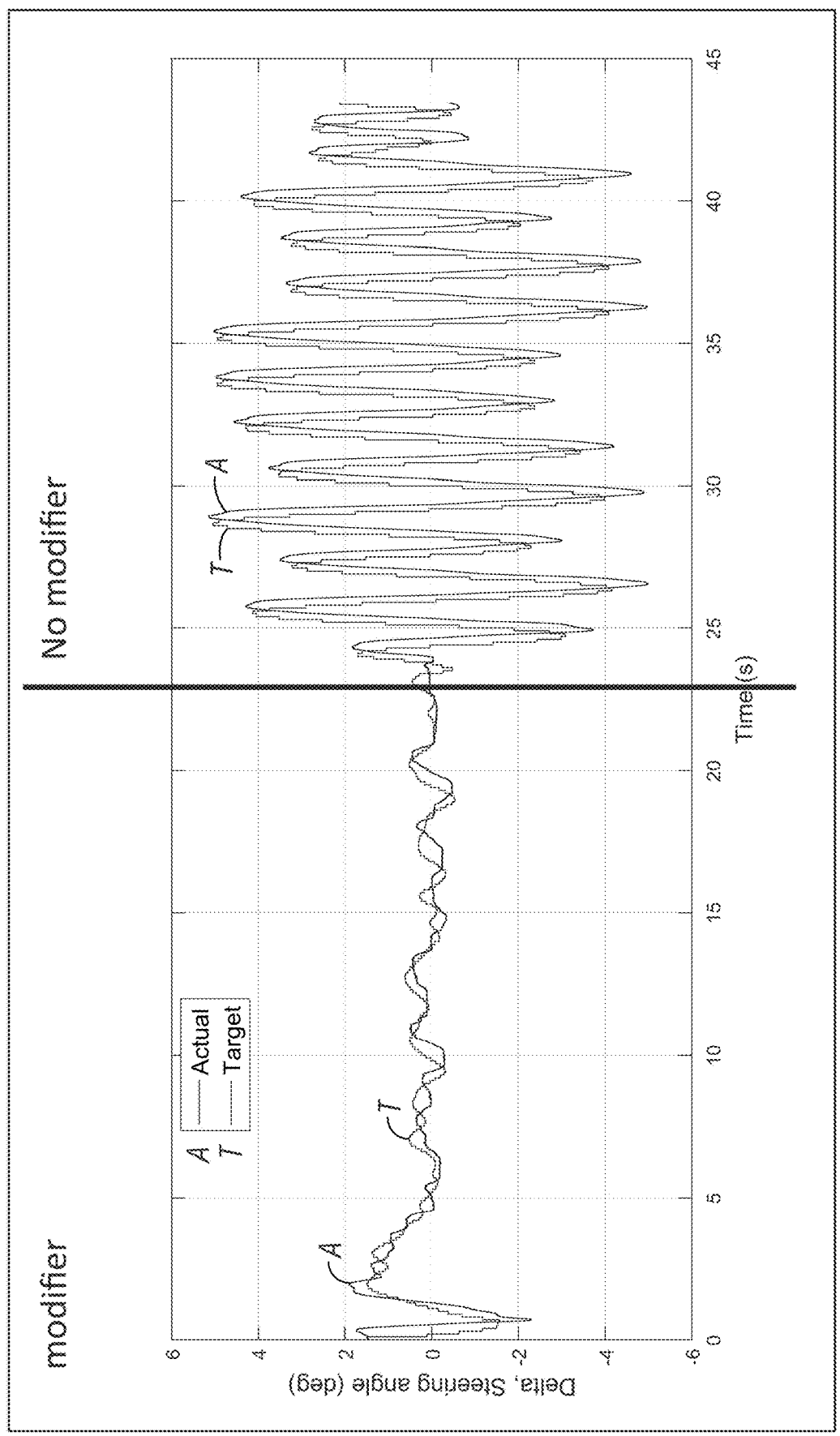
Figure 3C:
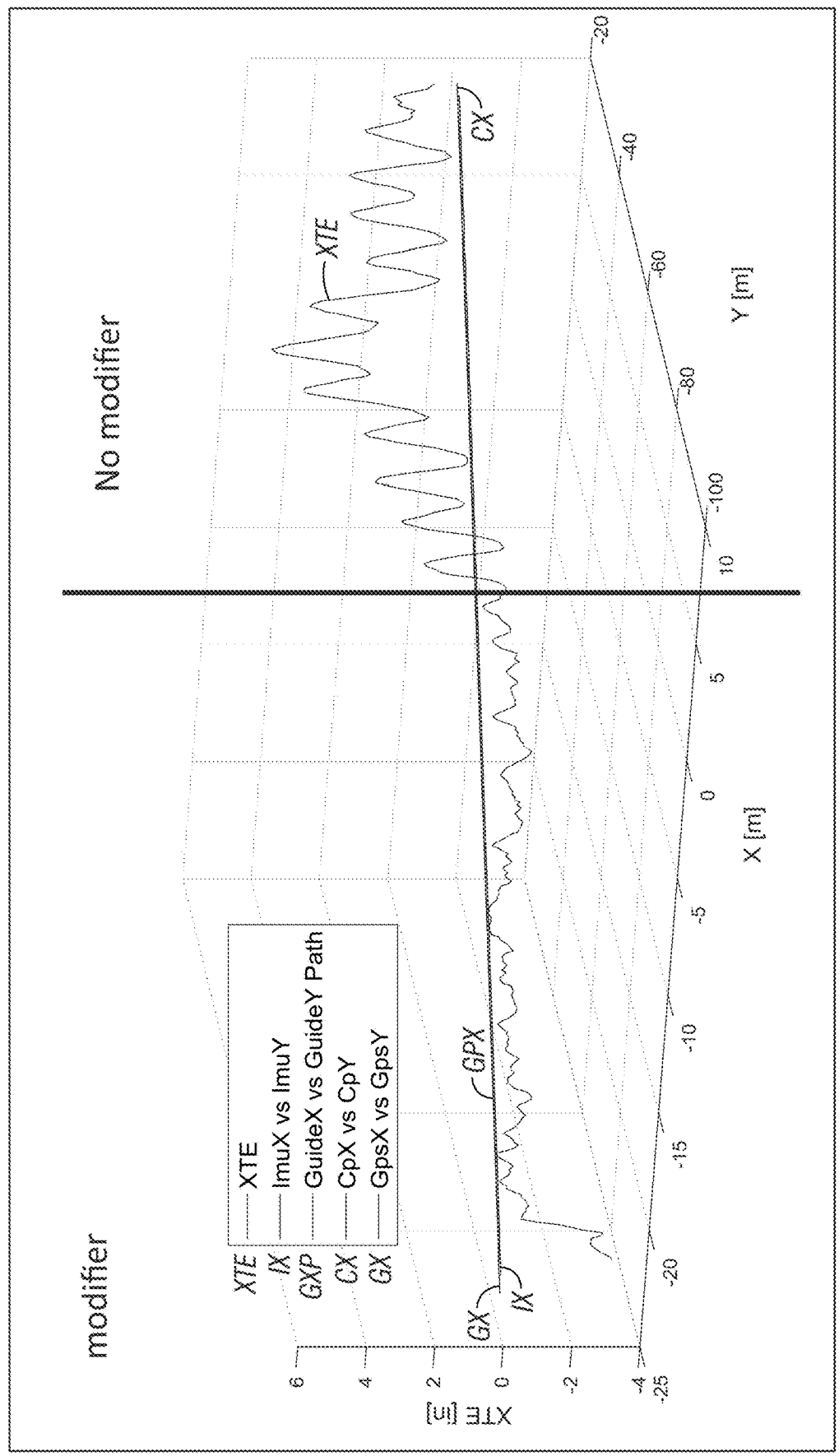
Figure 3D:
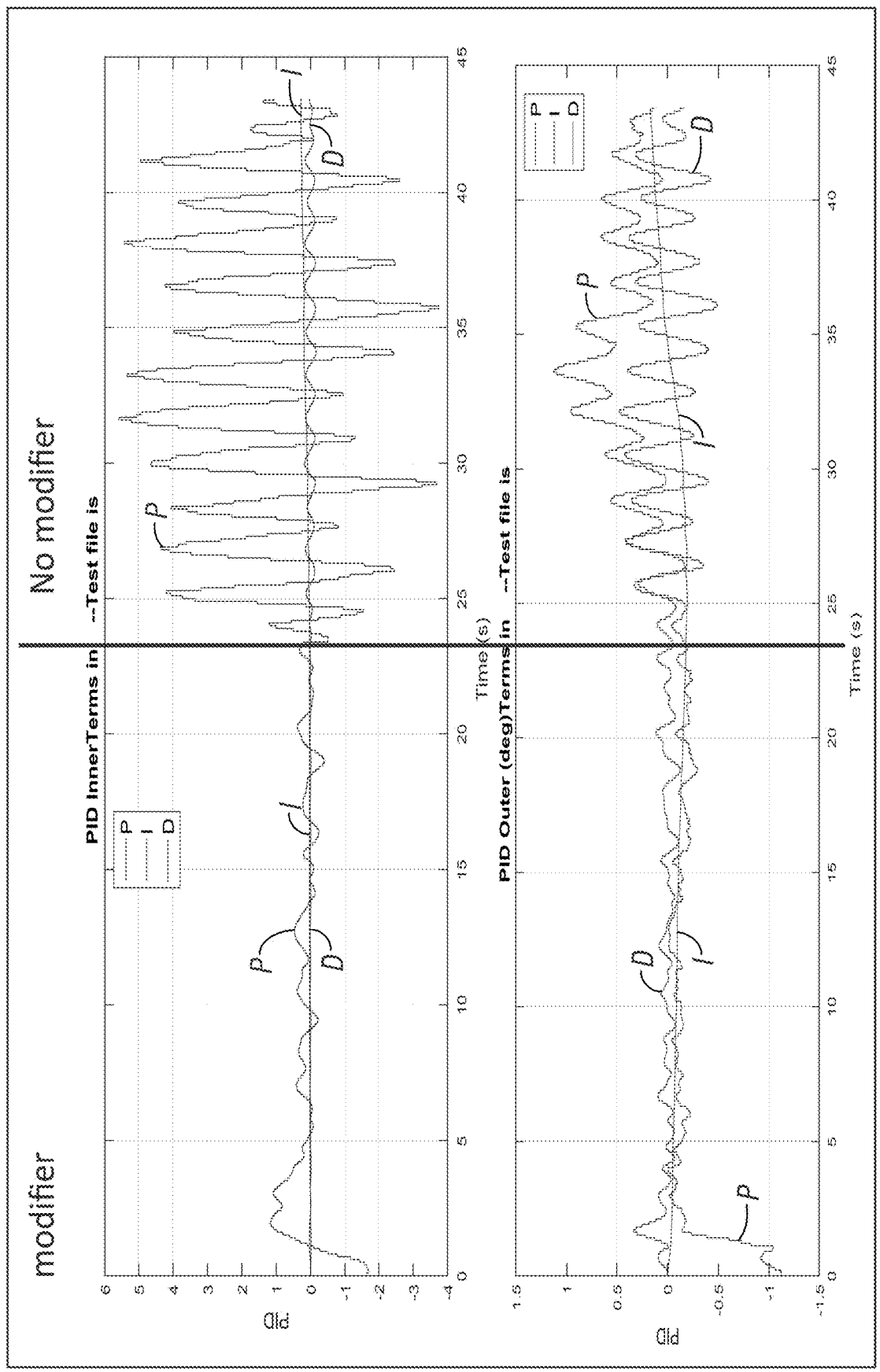

Testing for this specific example validates the modified system. As can be seen in the three graphs below at FIG. 3A-D, using the above-modifier significantly smoothes out steering response (left half of results in each of the three graphs of FIGS. 3A-D). In the graphs, FIGS. 3A and C, the section of graphs between Time 0 and 22.5 have much less deviation in heading error, cross track error, and in steering error ("error" as used here stands for the difference between "actual" and "target"), as compared to non-modified portion (right sections of those graphs between Time 22.5 and 43). The graph (FIG. 3B) shows clearly improvement in steering error. To reveal how much this exemplary embodiment of the invention helps, moderately high gains are selected in the system. In fact, the selected gains are the gains, being used for the CASE 210. FIG. 3D shows the components/contributions of the PID controllers. As seen, in the second part of the test, where the transformer (modifier) is disabled, the jerkiness in steering first yielded oscillation in heading loop, then the oscillation resulted in oscillation in XTE.

2. Field Testing (See FIGS. 3A-3D)

In test results indicated at FIGS. 3A-D, the embodiment of the invention functioned as follows. The system starts with the modifier of the invention and, then at time ~22.5 s, the modifier was turned off. Operation speed was 4 mph. The vehicle followed a straight line.

It can therefore be seen that this specific example achieves at least one or more the stated objects of the invention.

3. Specific Example of Hardware Set-Up In this example, the modification is coded discretely into the steering controller. This would be at the location labeled "transformer" in a typical automated steering system as illustrated diagrammatically in FIG. 4.

While this can involve a modification to the PID control software, this embodiment of the invention is a technology transformation with both overt and subtle real-world beneficial results. As mentioned, and as can be seen in FIGS. 3A-D, steering response as controlled by the autosteer does not result in persistent, and sometimes large magnitude changes or even oscillations; as well as realizes an improvement in XTE. This transforms what otherwise is disruptive autosteer to at least that similar to FrV autosteer. This has practical and physical benefits both for the vehicle operator as well as potentially for any function being accomplished by the vehicle.

As mentioned, this modified control for ArV operation can be used with the ArV alone, in conjunction with a function concurrently performed on the field by the ArV, or relative an implement being pulled, pushed, or otherwise operated with the ArV.

4. Supplemental Supporting Information

Supporting information can be found in the Appendices attached to U.S. Provisional Application 62/446,009, which is incorporated by reference herein in its entirely. Some of the information found there includes:

a. Similar to FIG. 1I herein, the nomenclature used for an ArV modeled vehicle, as well as key assumptions made in the design include:

(1) Wheelbases fore and aft ($L_1$ and $L_2$) are assumed to be approximately the same length, i.e. the distance from the front wheels to the middle articulation point and the distance from the rear wheels to the middle articulation point ($L_1 \approx L_2$).

(2) Articulation angles (θ) are assumed to be relatively small (i.e. <<90°, specifically very small such as approaching 0°, namely on the order of <15° or even <) 10°.

(3) Case 201 FrV dimensional features are compared to Steiger 400.

b. A comparison of Case 210 FrV and Steiger 400 ArV led to the discovery that at least at low speed the rate of change of articulation angle plays a major role in heading angle change of rate.

c. The transfer functions for articulated vehicles and the corresponding investigations led to how PID control loop can be modified to produce the benefits of the invention.

d. the basic relationships used to produce a modification function (transformer) M(s) that can be programmed into the PID control software based on the foundational discoveries. This transformer was first implemented in computer environment for validation and verification.

e. The starting point is comparing heading rate equation and transfer functions for Case 210 FrV versus Steiger 400 ArV, based on the listed assumptions. The modification function M(s) derived is:

$$M(s) = \frac{2V}{L} \frac{1}{s + \frac{V}{L_1}}$$

This function causes heading rate of ArV to be similar to FrV. As further noted, it may not require any other substantial modification of the PID.

f. A computerized simulation of expected autosteer system performance for ArV Steiger 400 with parameters was used in the simulation (note: simulations show closed loop characteristics without noise, which typically would exist at some level).

g. The computerized simulation of expected autosteer performance of an ArV such as Steiger 400, including heading and XTE performance results with the modification function of the invention applied, illustrated smoothness of performance including heading, XTE and other.

h. ArV with modification function behaves similar to FrV in XTE performance.

i. ArV with modification eliminates noisy performance regarding both heading and steering.

D. Options and Alternatives

The foregoing describes generalized and specific forms of the invention. As previously stated, the invention can take many forms and embodiments. Persons of skill in this technical area will appreciate the same.

For example, the invention can be tailored for application to a variety of ArV's. The designer would have to take into consideration the specifics of the particular ArV, but can apply the generalized invention in an analogous way.

By further example, the invention can be installed and operated in a variety of ways. It can be integrated into a control loop of the automated steering system with discrete code. It can also be integrated to modify driver steering input to avoid change in articulation angle in standing still for safety and to provide smoother operation in moving condition.

The assumptions upon which the modification function is based can vary. Examples are the wheel base lengths of the selected front wheel steered and articulated vehicles used.

Other options or alternatives for the designer are to use different sampling time, to use more or less wheel base lengths to smooth out or make the steering more aggressive.

What is claimed is:

1. A method of operating an automated steering system with a control feedback loop for an Articulated Vehicle (ArV) comprising:
   a. modeling steering performance of a Front Wheel Steered Vehicle (FrV) FrV; and
   b. modifying the steering control feedback loop in a manner where steering performance of an ArV reacts similar to that of an FrV, wherein the step of modifying comprises creating a modification function which effectively cancels rate of change of articulation angle in the heading kinematics of the ArV, which then affects heading angle rate of change.

2. The method of claim 1 wherein the modification function is in the form of:

$$M(s) = \frac{2V}{L} \frac{1}{s + \frac{V}{L_1}}$$

where
   V=velocity
   $L_1$=front wheel base for the ArV
   $L_2$=rear wheel base for the ArV
   s=complex variable
   And it is assumed:
      $L_1=L_2$ and
      articulation angle is relatively small (e.g. <15°).

3. The method of claim 2 wherein the modification function is discrete form comprises:

$$O(k+1) = e^{\left(-\frac{V}{L_1}T\right)}O(k) + \frac{2L_1}{L}\left(1 - e^{\left(-\frac{V}{L_1}T\right)}\right)I(k)$$

where,
   O stands for the output
   I stand for the input
   T stand for the sampling time, 0.1,s
   V stands for the velocity
   L stands for the wheel-base for a specific FrV (e.g. Case 210)
   L1 stands for the half wheel base for articulated vehicle (e.g. Steiger 400)
   K stands for discrete time step.

4. The method of claim 1 wherein the control loop includes a PID controller.

5. The method of claim 1 wherein the control loop includes an adjustable time constant.

6. The method of claim 1 wherein the PID controller includes inputs comprising:
   a. desired turning rate; and
   b. an adjustable time constant.

7. The method of claim 1 wherein the PID output comprises a steering command to a hydrostatic steering system, which converts the steering command into an actual turning rate.

8. The method of claim 1 wherein the ArV comprises an agricultural tractor.

9. The method of claim 8 wherein the agricultural tractor comprises:
   a. chassis only articulation;
   b. front wheel steer and chassis articulation;
   c. front wheel steer, rear wheel steer, and chassis articulation.

10. An automated steering system for an Articulated Vehicle (ArV) comprising:
    a. a set of navigation sensors;
    b. a set of vehicle motion models;
    c. a navigation planner which provides a steering angle instruction based on position heading data from the navigation sensors and motion status data from the vehicle motion models;
    d. a steering controller which modifies the steering angle instruction from the navigation planner by a feedback control loop wherein a part of modification comprises:
       i. modifying the control feedback loop in a manner where steering performance of an ArV reacts similar to that of a Front Wheel Steered Vehicle (FrV), wherein the modifying comprises a modification function which effectively cancels rate of change of articulation angle in the heading kinematics of the ArV, which then affects heading angle rate of change.

11. The automated steering system of claim 10 operatively installed in an ArV.

12. The automated steering system of claim 11 wherein the ArV includes:
    a. front steerable wheels
    b. rear steerable wheels, or
    c. both.

13. The automated steering system of claim 10 wherein the ArV includes a steering mechanism comprising a hydrostatic steering system.

14. An Articulated Vehicle (ArV) ArV comprising:
    a. a frame;
    b. a motor on the frame;
    c. an articulation point in the frame;
    d. a front wheel base from the articulation point to front wheels;
    e. a rear wheel base from the articulation point to rear wheels;
    f. a steering mechanism to control articulation angle of the frame at the articulation point;
    g. an automated steering system operatively connected to the steering mechanism comprising:
       i. a set of navigation sensors;
       ii. a set of vehicle motion models;
       iii. a navigation planner which provides a steering angle instruction based on position heading data from the navigation sensors and motion status data from the vehicle motion models;
       iv. a steering controller which modifies the steering angle instruction from the navigation planner by a feedback control loop wherein a part of modification comprises:
          1. modifying the control feedback loop in a manner where steering performance of an ArV reacts similar to that of a Front Wheel Steered Vehicle (Frv), wherein the modifying comprises a modification function which effectively cancels rate of change of articulation angle in the heading kinematics of the ArV, which then affects heading angle rate of change.

* * * * *